United States Patent [19]
Matsui

[11] Patent Number: 5,734,638
[45] Date of Patent: Mar. 31, 1998

[54] OBJECTIVE LENS ACTUATOR AND METHOD FOR MANUFACTURING THE SAME

[75] Inventor: Tsutomu Matsui, Tokyo, Japan

[73] Assignee: NEC Corporation, Tokyo, Japan

[21] Appl. No.: 761,235

[22] Filed: Dec. 6, 1996

Related U.S. Application Data

[63] Continuation of Ser. No. 388,523, Feb. 14, 1995, abandoned.

[30] Foreign Application Priority Data

Feb. 14, 1994 [JP] Japan .................................. 6-017092

[51] Int. Cl.⁶ .................................................. G11B 7/09
[52] U.S. Cl. ...................... 369/244; 369/247; 369/44.15; 359/814
[58] Field of Search ........................ 369/244, 247, 369/248, 44.14, 44.15, 44.16, 44.22; 359/814, 824

[56] References Cited

U.S. PATENT DOCUMENTS

| | | | |
|---|---|---|---|
| 4,646,283 | 2/1987 | Ito et al. | 369/256 |
| 4,927,235 | 5/1990 | Narumi | 369/44.15 |
| 5,323,369 | 6/1994 | Kim | 369/44.14 |

FOREIGN PATENT DOCUMENTS

| | | | |
|---|---|---|---|
| 61-296536 | 12/1986 | Japan . | |
| 62-36741 | 2/1987 | Japan | 369/44.15 |
| 62-65243 | 3/1987 | Japan . | |
| 62-202340 | 9/1987 | Japan . | |
| 63-119027 | 5/1988 | Japan | 369/44.15 |
| 63-224039 | 9/1988 | Japan . | |
| 63-311634 | 12/1988 | Japan | 369/44.16 |
| 1-72338 | 3/1989 | Japan . | |
| 2-232824 | 9/1990 | Japan . | |
| 2-308434 | 12/1990 | Japan . | |
| 4-319537 | 11/1992 | Japan . | |
| 4-324127 | 11/1992 | Japan . | |
| 4-325932 | 11/1992 | Japan . | |
| 5-114151 | 5/1993 | Japan | 369/44.15 |
| 5-68013 | 9/1993 | Japan . | |

*Primary Examiner*—Stuart S. Levy
*Assistant Examiner*—David L. Ometz
*Attorney, Agent, or Firm*—Ostrolenk, Faber, Gerb & Soffen, LLP

[57] ABSTRACT

It is the object of the invention to decrease the gain peak of an objective lens holder at a natural frequency of a biaxial objective lens actuator used in an optical disc system using a reproducing-only-disc, a write-once-disc or an erasable disc. The out-line of a construction is such that each support for the objective lens holder is composed of plural elastic wires surrounded by damping material (silicone, for example), and a damping effect can be achieved by shearing stress caused in the damping material, and each of the support springs passes through a hole of a damping box, wherein the clearance between the support spring and the inner wall of the hole of the damping box is filled with gelled damping material. A further improvement of damping can be achieved by the damping box.

12 Claims, 6 Drawing Sheets

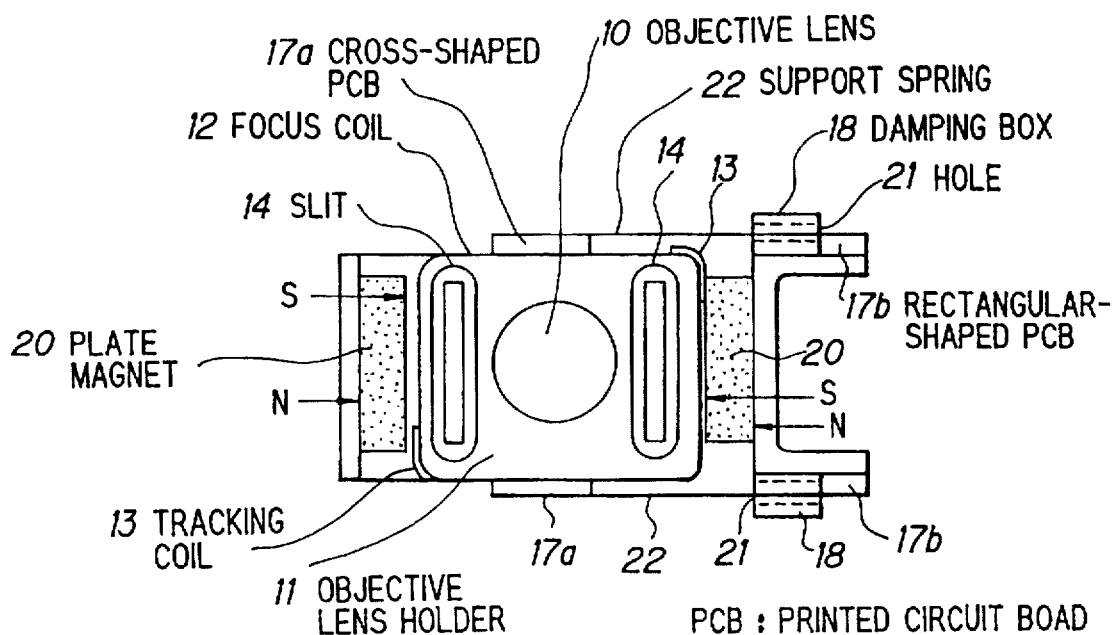
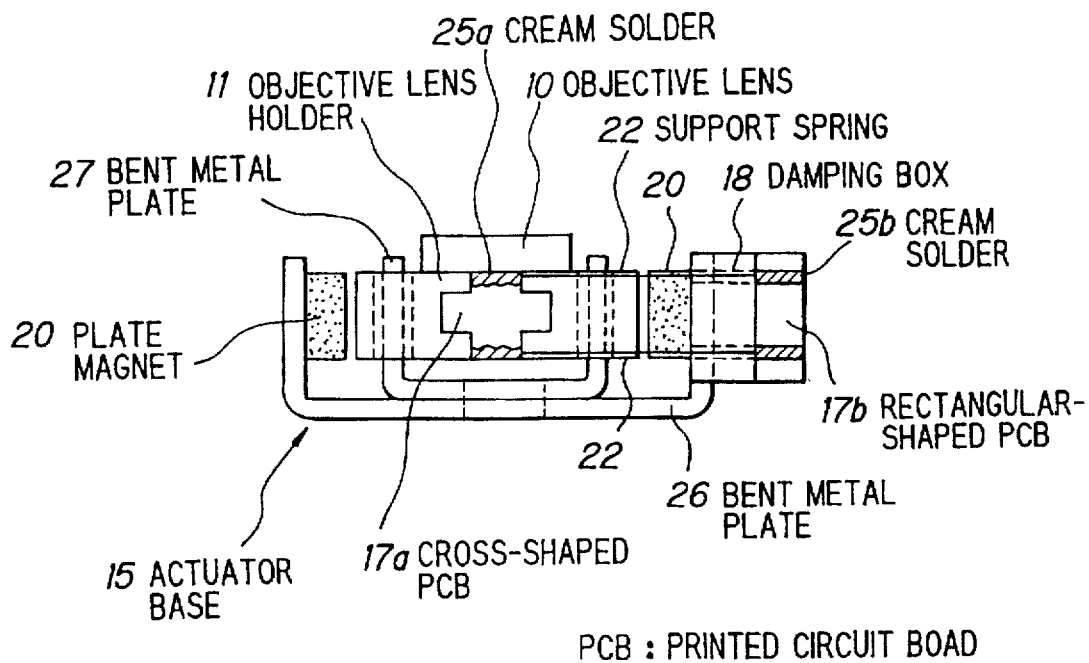

1

OBJECTIVE LENS ACTUATOR AND METHOD FOR MANUFACTURING THE SAME

CROSS-REFERENCE TO RELATED APPLICATION

This is a continuation of application Ser. No. 08/388,523, filed on Feb. 114,1995, now abandoned.

FIELD OF THE INVENTION

The invention relates to an objective lens actuator in an optical head to deal with various kinds of optical discs, such as a reproducing-only-disc, a write-once-disc and an erasable disc, and a method for manufacturing the objective lens actuator.

BACKGROUND OF THE INVENTION

An optical head focuses a light beam as a small spot on a recording track formed on an information recording surface of an optical disc, serving as a recording medium, and records, reproduces and erases in accordance with the variation of the light reflected from the information recording surface. Therefore, the light beam should be accurately focused on the recording track at all times, in spite of disc warp and disc vibration caused by the rotational movement of the disc. The focusing of the light beam is controlled by a small displacement of the objective lens in the direction of its optical axis (herein after the focus servo).

Since the light spot should precisely trace the recording track at all times, the position of the objective lens is minutely controlled in a direction perpendicular to the recording track (hereinafter tracking servo).

Technologies on focus and tracking servos are disclosed in Japanese Patent Kokai 5-68013, 4-319537, 62-65243 and 4-324127.

An apparatus playing the most important role in the above mentioned control of the light spot the is the objective lens actuator. The important structural elements of this apparatus are an objective lens holder and four supporting members for the lens holder. The objective lens holder includes an objective lens mounted thereon and a coil assembly, which generates electromagnetic forces for servo drive. One end of a supporting member is fixed to the objective lens holder and another end to the actuator base. In many cases, the supporting member is an elastic wire or an elastic leaf spring. A very important problem is hunting by the objective lens holder, which could arise in servo-drives of the objective lens holder. Also, improvements in the damping characteristic of the objective lens holder are extremely important, and considerable efforts should be made to improve not only the construction of the supporting system, but also the structure of the supporting member itself to attain such improvements.

Another important problem is the remaining mechanical stress in each supporting member due to the heat its is subjected to during soldering. The attitude of the optical lens to the actuator base becomes inaccurate on account on such remaining mechanical stress. Thus, an improvement in the soldering process is very important.

SUMMARY OF THE INVENTION

Accordingly, it is an object of the invention to provide an objective lens actuator, in which a damping characteristic is remarkably improved compared with the one of a conventional objective lens actuator.

It is a further object of the invention to provide a method for manufacturing an objective lens actuator without remaining mechanical stresses in supporting members for an objective lens in spite of soldering.

According to the first feature of the invention, an objective lens actuator comprises:

an objective lens holder which is movable in focus and tracking directions in accordance with their respective control signals;

an actuator base which serves as a foundation of other structural elements;

four support springs for the objective lens holder, each of which is composed of plural elastic wires with damping material filling clearances therebetween; and damping boxes being fixed to the actuator base and having holes bored therethrough, each of which contains one of the four support springs surrounded with gelled damping material.

According to the second feature of the invention, a method for manufacturing an objective lens actuator comprises the steps of:

constructing two magnetic circuits, a portion of which serves as an actuator base, by combining two bent metal plates and two plate magnets;

constructing an objective lens holder by mounting an objective lens thereon;

constructing a coil assembly combining a focus coil wound around the objective lens holder and a pair of tracking coils stuck on the focus coil;

constructing four support springs for the objective lens holder, each of which is composed of plural elastic wires with damping material filling a clearance therebetween, and fixed to the actuator base through a damping box;

constructing an electromagnetic force generating means by combining the magnetic circuits and the coil assembly in such a way that the coil assembly is movable in focus and tracking directions;

sticking two first and two second printed circuit boards on the objective lens holder and the actuator base respectively;

coating all of the printed circuit boards with cream solder;

supporting one of plural elastic wires in each of the four support springs between the first and second printed circuit boards, wherein the one of plural elastic wires is in no mechanical stress condition and its both ends contact with cream solders on the first and second printed circuit boards respectively; and soldering the both ends and the first and second printed circuit boards by non-contact heating.

BRIEF DESCRIPTION OF THE DRAWINGS

The invention will be explained in more detail in conjunction with appended drawings, wherein:

FIGS. 2A and 2B are respectively a plan view and a front view of an objective lens actuator according to the present invention.

DESCRIPTION OF THE PREFERRED EMBODIMENTS

Before explaining the present invention in the preferred embodiments, the aforementioned conventional objective lens actuator will be explained.

Figure 1:
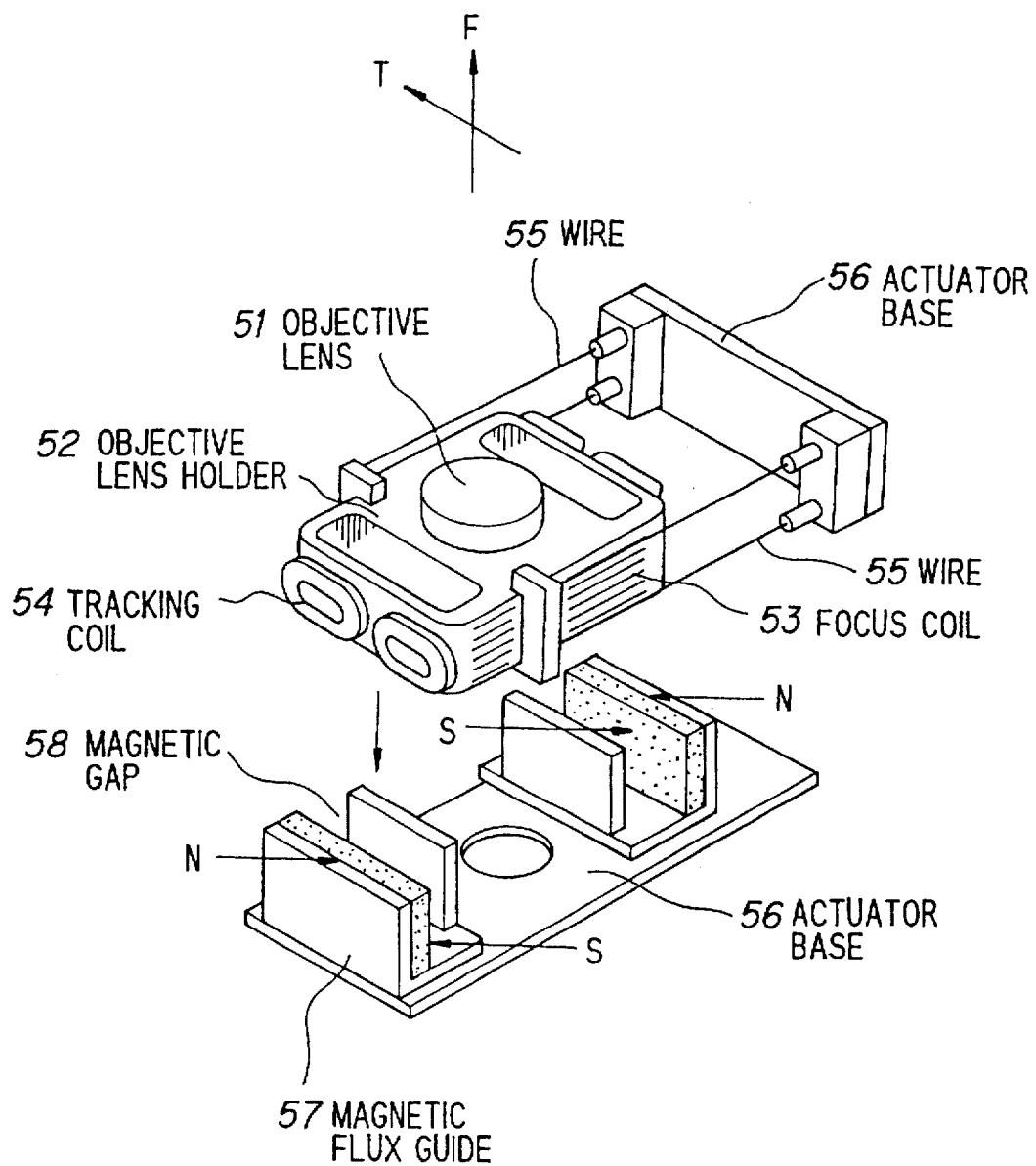
FIG. 1 shows the structure of a conventional actuator.

FIG. 1 shows the structure of a four-wire supported objective lens actuator for servo-driving the objective lens, which is used in a conventional optical head. As shown in FIG. 1, a disassembled and perspective drawing, an objective lens 51 is mounted on an upper surface of a rectangular-shaped lens holder 52. On the outer periphery of the objective lens holder 52, a focus coil 53 is wound so that the central axis of this coil runs parallel with the optical axis of the objective lens 51. Four rectangular shaped tracking coils 54 are stuck on both sides of the focus coil 53.

The focus coil 53 and the tracking coils 54 are placed in a magnetic gap 58, which is the portion of a nearly closed magnetic circuit comprising a plate magnet, an L-shaped magnetic flux guide 57 and magnetic yoke. In the magnetic gap 58, the direction of magnetic flux is perpendicular to the conductors of the coils. The coils can move in the focus and tracking directions by the electro-magnetic forces acting on the coil conductors.

The objective lens holder 52 is supported by four wires 55, the left ends of which are fixed to an actuator base 56 as shown in FIG. 1. The wires 55 are made of elastic metal such as phosphor bronze. In addition to the above mentioned function, the four wires (the elastic supporting members or the spring supporting members) 55 have a function to electrically connect print circuit boards located on the objective lens actuator 52 to ones located on actuator base 56.

In the conventional actuator, the objective lens holder is allowed to move not only in the focus and tracking directions, wherein the above mentioned directions are shown as arrows F and T respectively in FIG. 1, but also in a direction perpendicular to the focus and tracking directions. Moreover, the lens holder is permitted to rotate around the three orthogonal rotational axes ($\theta x$, $\theta x$ and $\theta z$), mentioned above. However, the objective lens can follow the disc vibrations in the focus and tracking directions.

Aside from problems on structures, a very important problem in the operation of a conventional four-wire supported actuator is the movement characteristic of the lens holder, especially stability in the case of pulling-in servo. If the lens holder is directly supported by phosphor bronze wires without any damping device in the above mentioned structure, a difference between a resonance amplitude at a natural frequency (a peak gain, hereinafter) and a DC amplitude (a DC gain, hereinafter) becomes as large as 30 dB. When the gain peak is so large, the pulling-in of focus and tracking servos becomes unstable. Especially, in the case of the pulling-in tracking servo, hunting could arise in the natural frequency when positioning the lens holder by a driving force. To achieve stable pulling-in servos, structures of supporting members and materials should be selected so that the gain peak becomes lower than −20 dB.

Heretofore, no literature has referred to the guide lines for designing this apparatus, and those in this field have been obliged to design by the method of trial and error. As a more reasonable method compared with conventional ones, they can cite the modal strain energy method, in which damping factors of materials are supplied to a computer as input data, and numerical analyzes can be progressed to some extent. However, this method cannot lead them to the design concept on a fundamental structure.

In the construction shown in FIG. 1, the printed circuit board (hereinafter referred to as PCBs) stuck on the objective lens holder 52 and the other ones on the actuator base 56, which serves as the foundation in the assembling process of this apparatus, are connected by phosphor bronze wires, wherein both ends of the wires 55 are soldered to the aforementioned PCBs respectively. However, these wires are not very stiff, and if a soldering iron is used in an assembling process, the wires are mechanically stressed. Therefore, when the actuator is removed from a jig, the position and attitude of the objective lens holder, being supported by four wires, become imprecise with respect to the actuator base.

It is the feature of the invention to clarify the structures of damping devices and damping materials used in the device, being suitable for decreasing the gain peak, and to provide an objective lens actuator with stable pulling-in focus and tracking servos.

Another feature of the invention is to provide a manufacturing method, in which non-contact soldering can be applicable, when the supporting wires are soldered to the PCB.

The following are preferred embodiments of the present invention explained with reference to the appended drawings.

Figure 3:
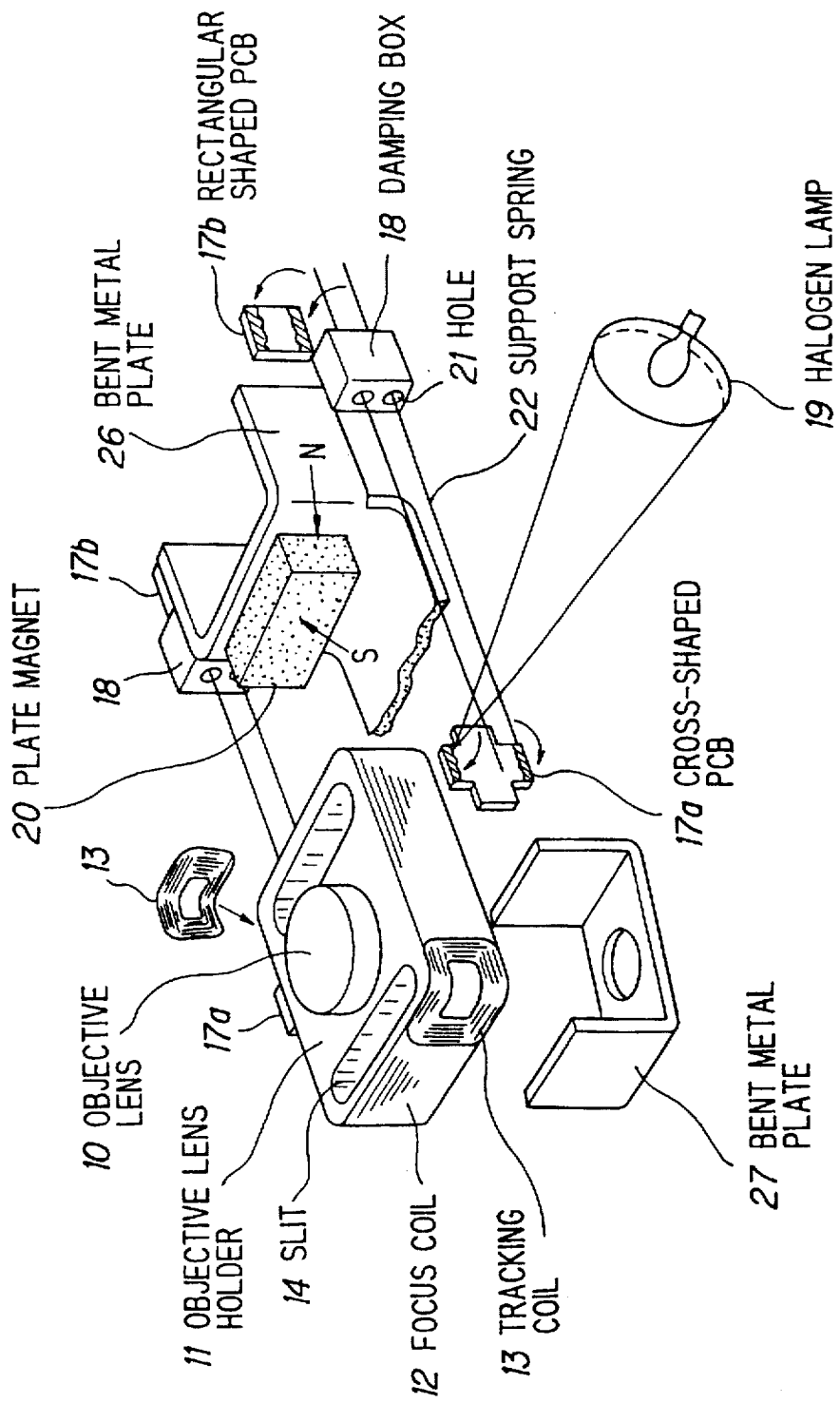
FIG. 3 is a disassembled and perspective view of an objective lens actuator according to the present invention.

FIGS. 2A and 2B respectively show plan and front views of a preferred embodiment of the actuator according to the present invention FIG. 3 is the disassembled and perspective drawing of the actuator of FIGS 2A and 2B.

A focus coil 12 is wound on the outer periphery of a lens holder 11, and a pair of tracking coils 13 with flat and rectangular configurations are disposed on the corners on the same diagonal of the focus coil 12. The rectangular shaped lens holder 11 is provided with a pair of slits 14, into which yokes, which serve as the portions of magnetic circuits as mentioned later, are inserted. Moreover, a pair of cross-shaped printed circuit boards 17a are disposed on both sides of the lens holder 11.

One of plural wires composing support spring 22, which will be mentioned later, is soldered to cross-shaped printed circuit boards 17a by means of non-contact soldering. Accordingly, the cross-shaped printed circuit board 17a are coated with cream solder 25a. An objective lens 10 is mounted on the lens holder 11.

On the other hand, an actuator base 15 serves also as the portion of a magnetic circuit, and is composed of two bent metal plates 26 and 27. The bent metal plate 27 is shaped into an U-shaped yoke, being put on the other bent metal plate 26. These bent metal plates 26 and 27 are attached together. The vertical portions of the bent metal plate 27 are inserted into the slits 14 of the lens holder 11. Plate magnets 20 are attached to the inner surfaces of the vertical portions of the bent metal plates 26. A pair of rectangular-shaped PCBs 17b are fixed to both sides of the bent metal plate 26 near portions where the wires are attached to the bent metal plate 26 together with a pair of damping boxes 18.

Similarly to the case of the soldering in the PCB 17a, the rectangular shaped PCB 17b is coated with cream solder 25b, in order to solder a wire, which is one of the plural wires composing the supporting spring 22 and is soldered to the cross-shaped PCB 17a, to the PCB 17b by means of non-contact soldering.

As mentioned above, the supporting spring 22 is composed of plural wires (two or three wires, for example) and the clearance between the wires is filled with silicone rubber. A damping effect can be achieved by the shear stress caused in this structure. Both ends of one of the plural wires are soldered to the cross-shaped PCB 17a and the rectangular shaped PCB 17b respectively.

The damping box 18 is provided with two holes 21, into which the support springs 22 are inserted without contacting with the inner surfaces of holes 21, and the clearances between the supporting springs 22 and the inner surfaces of the holes 21 are filled with silicone-gel.

Figure 4:
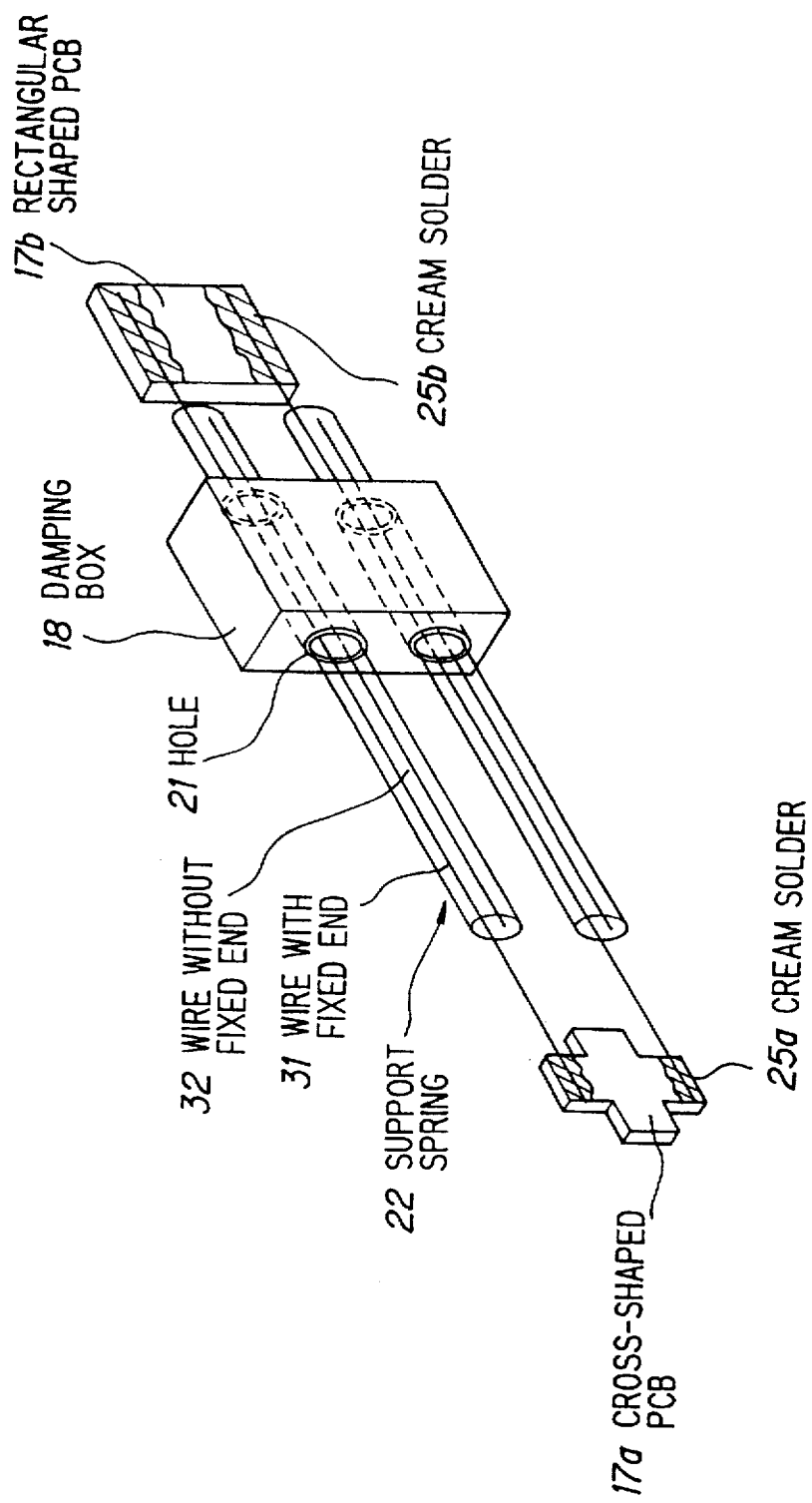
FIG. 4 is a perspective view of the damping box of an actuator according to the present invention.
Figure 5A:
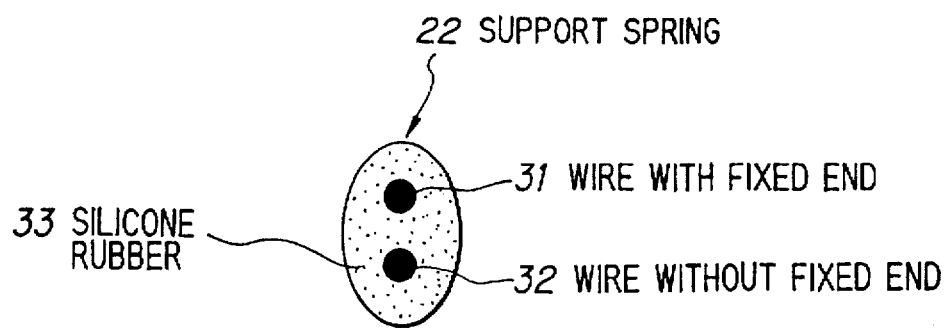
FIGS. 5A and 5B are respectively cross-sectional views of a support spring and damping boxes according to the present invention.

In the aforementioned structure, the function of the support springs 22 and the damping box 18 is to decrease the peak gain at the natural frequency, which will be explained in more detail referring to FIGS. 4–5. FIG. 4 is a perspective drawing showing the condition that the support springs 22 are fitted to the holes 21 in the damping box 18. FIG. 5A shows a transverse cross-sectional view of the support spring 22, and FIG. 5B shows a longitudinal cross-sectional view of the damping-box 18 and its neighboring portion.

The support spring 22 is composed of two wires 31 and 32, and the wire 31 is longer than the wire 32. These two wires are parallel to each other and covered with silicone rubber 33 except for both ends of wire 31. It should be noted that wire 31 has fixed ends, but wire 32 has no fixed ends. In other words, both ends of wire 32 are free.

The rectangular parallelepiped shaped damping boxes 18 are stuck on both sides of the bent metal plate 26, which is one of the two bent metal plates composing the magnetic circuits. Each of the damping boxes is provided with two holes 21. The two support springs 22 are inserted into these holes 21 without contacting the inner walls of these holes. Clearances between the support springs 22 and the inner walls of the holes 21 are filled with silicone-gel 34.

Figure 5B:
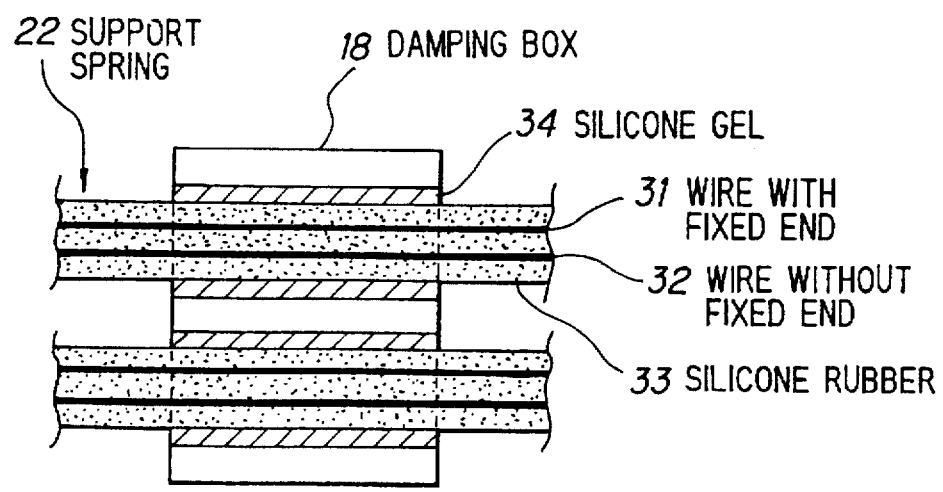

FIG. 5B shows a cross-sectional view of the damping box 18 and its neighboring portions of the wires, wherein the cross-section runs parallel with the wires 31 and 32. It can be seen that, the wires 31 and 32 are covered by silicone rubber 33, and their outer periphery is filled with silicone-gel 34.

Next is explained a structure of the actuator in which the objective lens holder is supported by the support springs without inclination to the actuator base and the assembling of the actuator. Generally, the objective lens of an optical head for high density recording and high bit rate transfer has a numerical aperture larger than 0.55. In designing the apparatus for the so called digital recording, it is very important to make a bit length on the track as short as possible. In the case of Run Length Limited (RLL) modulation, in order to secure a recording density of 0.34 μm/bit, for example, the recording density should be less than 0.45 μm/mark. The necessary condition to secure the aforementioned recording density is that the lasing wave length of a light source=680 nm, the numerical aperture of the objective lens 10=0.55 and the beam diameter at normalized power of $e^{-2}$=1.0 μm. In a case where the objective lens has a numerical aperture of 0.55, the inclination of the optical axis of the lens should be established within ±0.2°.

If a conventional soldering iron contacts the wires and the PCBs in the assembling process, mechanical stresses remain in the wires. Therefore, when jigs are removed after soldering, the lens holder is inclined to the actuator base. Accordingly, in the preferred embodiment of the present invention shown in FIG. 3, the cream solders 25a and 25b are coated on the cross-shape PBC 17a and the rectangular shaped PCB 17b in advance, and the both ends of the wire 31 contact the cream solders 25a and 26b. In this case, a special attention should be paid to realize the condition that there is no mechanical stress in the wire 31. The cream solder 25a and 26b on the PCBs 17a and 17b are heated by the light from a halogen lamp 19, and both ends of the wire 31 are soldered to the PCBs 17a and 17b respectively. By the above mentioned method, the accurate attitude of the objective lens holder 11 to the actuator base 15 can be established, even when the actuator is removed from the jigs.

Figure 6:
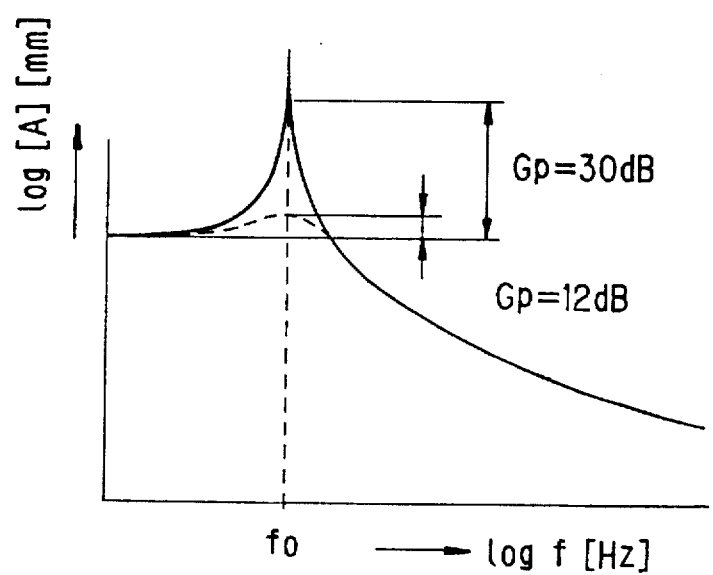
FIG. 6 shows the Bode diagrams for transfer functions which represent the decrease of a gain peak achieved by improvement of damping characteristics of an objective lens actuator according to the present invention.

The transfer characteristics of the aforementioned structures were measured to prove the damping effect of the preferred embodiment of the present invention, and the results are shown in FIG. 6. FIG. 6 shows Bode diagrams for transfer functions in which is shown a decrease in the gain peak at the natural frequency.

In the conventional four wire supported actuator shown in FIG. 1, the gain peak is 30 dB. When only the support springs composed of plural wires are introduced, the gain peak becomes 20 dB, and is decreased by 10 dB compared with the one of the conventional actuator. When the damping boxes are additionally introduced, a further reduction of gain peak is 8 dB by the effect of gel-immersion. In this case, the gain peak is 12 dB, and a remarkable improvement is achieved.

It can be seen from the Bode-diagrams for transfer function shown in FIG. 6 that improvement in damping is as large as 18 dB as compared with that of the conventional actuator without any damping device, by the damping characteristics of the support springs and gel-immersion according to the invention. As expected from the transfer characteristics, a stable random access becomes possible.

In the objective lens actuator according to the invention, the gain peak at the natural frequency can be decreased down to 20–10 dB, and stable pulling-in servo and servo drive can be achieved.

In the method for manufacturing the objective lens actuator according to the present invention, the wire, which serves as an electric conductor between the movable objective lens holder and the fixed portion of the actuator base, is set in a non-stressed condition and soldered in the same condition.

Although the invention has been described with respect to specific embodiment for complete and clear disclosure, the appended claims are not to be thus limited but are to be construed as embodying all modification and alternative constructions that may occur to one skilled in the art which fairly fall within the basic teachings set forth.

What is claimed is:

1. An objective lens actuator comprising:

an objective lens holder;

four support springs for supporting said objective lens holder in such a way that said objective lens holder is allowed to move in a focus direction of an optical axis of said objective lens and in a tracking direction perpendicular to said optical axis;

an actuator base;

each of said four support springs includes plural non-coiled elastic wires with clearance between said wires being filled with damping material, a portion of each of said support springs being fixed to said actuator base through a damping box, and each of said four support springs having one of said non-coiled elastic wires without fixed ends; and electromagnetic force generating means to drive said objective lens holder in said focus and tracking directions, with such directions being perpendicular to each other.

2. An objective lens acuator, according to claim 1, wherein:

said damping box is provided with a hole into which said pluaral non-coiled elastic wire of said support springs are inserted without contacting an inner wall of said damping box, and a clearance therebetween is filled with gelled damping material.

3. An objecting lens actuator, according to claim 2, wherein:

both ends of one of said plural non-coiled elastic wires of said support spring are soldered to printed circuits disposed on said lens holder and said acuator base, respectively.

4. An objective lens actuator, according to claim 3, wherein:

said damping material is silicone, and said gelled damping material is gelled silicone.

5. An objective lens actuator, comprising:

an objective lens holder which is movable in focus and tracking directions in accordance with respective control signals;

an actuator base which serves as a foundation for said objective lens actuator;

four support springs for said objective lens holder, each support spring includes plural non-coiled elastic wires with damping material filling clearances therebetween, and each of said four support springs having one of its plural non-coiled elastic wires without fixed ends; and damping boxes being fixed to said actuator base and having holes therethrough, each of said holes contains one of said four support springs surrounded with gelled damping material.

6. An optical lens actuator, according to claim 5, wherein;

both ends of one of said plural non-coiled elastic wires of each said support spring is directly connected to said objective lens holder and said actuator base, respectively.

7. An optical lens actuator, according to claim 6, wherein:

both ends of one of said plural non-coiled elastic wires are soldered to a printed circuit board disposed on said lens holder and another printed circuit board disposed on said actuator base.

8. An objective lens actuator, comprising:

a lens holder for holding an objective lens to focus a light on an optical disc, said objective lens being moved in an axis direction of said light and a tracking direction orthogonal to said axis direction by an electro-magnetic force;

a base member for supporting said lens holder by using a plurality of elastic wires, each of said elastic wires being a single non-coiled wire in cooperation with at least one other non-coiled wire, and said single wire fixed at its ends to said lens holder and said base member respectively, and said one other non-coiled wire being without fixed ends; and a damper for damping said lens holder at a resonant frequency, said damper being fixed around said elastic wires.

9. An objective lens actuator, according to claim 8, wherein:

said elastic wires comprise first and second pairs of elastic wires, said first and second pairs of elastic wires being fixed to first and second sides of said lens holder; and said damper comprises first and second damping boxes, said first and second damping boxes having holes to fix said first and second pairs of elastic wires.

10. An objective lens actuator, according to claim 9, wherein:

said damping boxes are of silicon rubber; and said first and second pairs of elastic wires are fixed in said holes of said damping boxes by silicone gelled into said holes.

11. An objective lens actuator, according to claim 8, wherein:

said lens holder has a pair of circuit boards on first and second sides thereof; and first and second pairs of said elastic wires are fixed on said pair of circuit boards by cream solder, said cream solder being hardened by light irradiation.

12. An objective lens actuator comprising:

an objective lens holder;

four support springs for supporting said objective lens holder in such a way that said objective lens holder is allowed to move in a focus direction of an optical axis of said objective lens and in a tracking direction perpendicular to said optical axis;

an actuator base;

each of said four support springs includes plural non-coiled elastic wires with clearance between said wires being filled with damping material, a portion of each of said support springs being fixed to said actuator base through a damping box, and each of said four support springs having one of said non-coiled elastic wires without fixed ends; and, a driver for generating electromagnetic forces to drive said objective lens holder in said focus and tracking directions, with such directions being perpendicular to each other.

* * * * *